Patented Jan. 10, 1950

2,494,204

UNITED STATES PATENT OFFICE 2,494,204

PREPARATION OF 2-CYANOPYRIDINES

Ivan Maxwell Robinson and George John Janz, McMasterville, Quebec, Canada, assignors to Canadian Industries Limited, Montreal, Quebec, Canada, a corporation of Canada No Drawing. Application April 19, 1946, Serial No. 663,632. In Canada August 17, 1945

5 Claims. (Cl. 260—296)

This invention relates to a process for reacting cyanogen with 1,3-dienes. More particularly it relates to a process for the preparation of 2-cyanopyridine and novel derivatives thereof by the reaction of cyanogen with butadiene or substituted 1,3-dienes.

It is an object of the present invention to provide a method for reacting cyanogen with 1,3-dienes. A further object is to prepare 2-cyanopyridine and novel substituted 2-cyanopyridines. Other objects of this invention will be apparent from the description given hereinafter.

The objects of this invention are attained by reacting cyanogen with a diene such as butadiene in either liquid or vapour phase, at atmospheric or superatmospheric pressures and at temperatures ranging from approximately 90° to 700° C. The products obtained are 2-cyanopyridines or substituted 2-cyanopyridines.

It has been found that cyanogen may be reacted with 1,3-dienes of the general formula

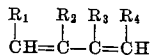

in which $R_1$ and $R_4$ represent alkyl substituents or hydrogen and $R_2$ and $R_3$ represent alkyl, nitrile or halogen substituents or hydrogen. It seems likely that the mechanism of this reaction involves a Diels-Alder type of condensation with subsequent elimination of hydrogen. The nitrile groups in this case act as dienophiles according to the usual meaning of the term in reference to Diels-Alder condensations (Norton, Chem. Rev., 31, 1941). A dihydropyridine derivative first forms, through a 1,4 addition of cyanogen to the 1,3-diene, which then dehydrogenates to yield a pyridine derivative as the final product. This mechanism may be formulated as

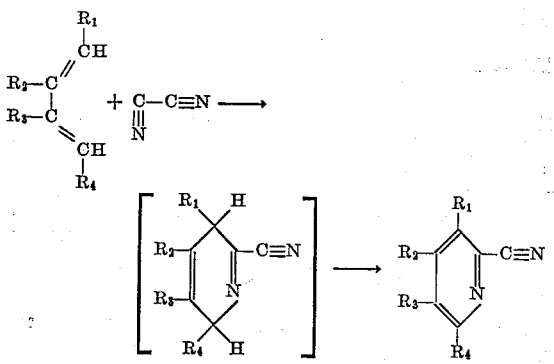

in which $R_1$, $R_2$, $R_3$ and $R_4$ have the significance noted above. The intermediate dihydropyridine and dihydropyridine derivatives have not been isolated in this reaction. When both nitrile groups take part in the Diels-Alder condensation a dipyridyl derivative results.

The mechanism described above is proposed merely as a possible course which the reaction may follow. It is not intended that the explanation will in any way limit or influence the scope of the claims.

The condensation of 1,3-dienes and cyanogen according to the process of this invention may be conducted at temperatures ranging from about 90° C. to about 700° C. Temperatures beyond the extremes noted may be used, but slower reaction rates result at the lower temperatures, and pyrolysis is severe at higher temperatures. At the lower part of the temperature range, superatmospheric pressure is required to obtain reasonable rate of reaction with certain dienes, as for example, butadiene. At the higher part of the temperature range with certain 1,3-dienes severe pyrolysis of the compounds results in low yields. In the case of butadiene a range of 450–500° C. is preferred at atmospheric pressure.

The reaction, according to the process of this invention, may be carried out at atmospheric pressure, or at any higher value, depending only on the capacity of the equipment to withstand the pressure used.

Contact times suitable for the process of this invention may be varied widely. At about 700° C. in the vapour phase and at atmospheric pressure using butadiene and cyanogen, contact times of from 0.5 to 90 seconds are suitable as shown in Example II. At about 500° C. under otherwise similar conditions 18 to 120 seconds are suitable as shown in Example I. The contact time does not necessarily fall within the above ranges, but may be varied widely. The preferred contact time for a particular set of reactants will be influenced by the temperature.

The above-described process may be conducted in the liquid or vapour phase and either by a batch or continuous process.

The reaction products are condensed from the unreacted material at about 20° C. and the unreacted 1,3-diene and cyanogen are recovered by condensation at low temperatures, such as that of a dry-ice-acetone trap.

The products of this invention may be isolated by distillation of the crude reaction mixture preferably under reduced pressure. They may be further purified by recrystallization from suitable solvents. Other methods of isolation and purification such as, for example, solvent extraction, may be used, as is, of course, apparent to one skilled in the art.

The detailed practice of the invention is illustrated by the following examples. There are, of course, many forms of the invention other than these specified embodiments.

*Example I.*—1,3-butadiene and cyanogen in a molar ratio of 1.0:1.0 are passed through a steel vapour phase reactor for a total time of 13 hours. The temperature of the reactor is maintained at about 480° C. and the contact time of the gases in the reaction zone is about 87 seconds. The total recovery, as liquid product and unreacted butadiene and cyanogen, is 84.5% by weight of the initial material input. The yield of product, stripped from the gases leaving the hot reaction zone by a water-cooled condensing system is about 3.8% by weight, calculated on the total input of butadiene and cyanogen. After removing the more volatile portions, fractional distillation at 8–12 mm. Hg pressure in a Whitmore-Fenske column is used to separate the 2-cyanopyridine from the crude liquid product. After 47% of the crude product is found to be 2-cyanopyridine.

Table I summarizes this data and lists for comparison the results of two other trials at different contact times.

drochloride prepared in this manner the free picolinic acid is easily prepared. The acid thus isolated melted at 135–136° C. (corrected); the literature values are 136–137° C., 134.5–136° C. for picolinic acid. By heating the 2-cyanopyridine with lime, it is decarboxylated and pyridine may be separated from the mixture by distillation. It was identified by its boiling point, and by the X-ray diffraction pattern of its picrate.

Investigation of the fraction of the crude product boiling higher than 2-cyanopyridine has shown the presence of 2,2'-dipyridyl. It is separated by distillation in the Whitmore-Fenske column at 133–134.5 C., 11 mm. HG pressure, and has the following properties: (I) M. P. (impure) 56.6° C. (II) B. P. 760 mm. Hg 270–272° C., (III) picrate, M. P. 154–155.5° C., (IV) characteristic colour reaction with ferrous ions. The properties reported in the literature for 2,2'-dipyridyl are (I) M. P. 69.5° C., (II) B. P. 760 mm. Hg 272.5° C., (III) picrate M. P. 154–155.5° C., (IV) characteristic colour reaction with ferrous ions.

*Example II.*—1,3-butadiene and cyanogen in a molar ratio of 0.77:1.0 are passed through a steel vapour phase reactor for a total time of 8 hours. The reactor temperature is maintained at about 680° C. and the contact time of the gases in the reaction zone is about 33 seconds. The total re-

*Table I*

| Temp., ° C. (approx.) | Contact Time, Secs. | Reactant Ratio Butadiene: Cyanogen, moles | Total Material Recovery (per cent of Input, by weight) | Crude Liquid Product (per cent of Input, by Weight) | 2-Cyano Pyridine (per cent of Crude Prod., by weight) | 2-Cyano Pyridine (per cent of Input, by weight) | Duration of Run |
|---|---|---|---|---|---|---|---|
| 480 | 98 | 1.0:1.0 | 84.5 | 38.5 | 47 | 18.1 | Hours 13 |
| 480 | 120 | 0.85:1.0 | 74 | 28.5 | 48 | 13.7 | 6.5 |
| 470–490 | 25 | 1.28:1.0 | 85.5 | 18.7 | 33 | 6.17 | 1.66 |

The 2-cyanopyridine separated from the crude product by fractional distillation, as mentioned above, is further purified by filtering off the crystals at 0° C., and by washing and recrystallizing them from cold ether. It is found to have the following properties: (I) melting point, 27.0–27.5° C. uncorrected; literature, 29° C., 26° C.; (II) refractive index $n_D^{25}$ 1.5242, density $D_4^{25}$=1.0810; (III) boiling point, 222–227° C. uncorrected, literature (a) 212–215° C., (b) 222.5–223.5° C.; (IV) analysis C. 70.00%, H. 4.07%, N. 26.04%; theoretical for $C_6H_4N_2$, C. 69.22%, H. 3.87%, N. 26.91%.

In order to identify the product, picolinic acid hydrochloride has been prepared by subjecting the 2-cyanopyridine to hydrolysis with aqueous sodium hydroxide, and separating the acid as the hydrochloride. The results of the analysis for the picolinic acid hydrochloride are: C. 45.44%, H. 4.21%, N. 8.55%, Cl (ionic), 21.83, (total), 21.95; theoretical for $C_6H_6NO_2Cl$, C. 45.15, H. 3.79, N. 8.78, Cl 22.23. From the picolinic acid hycovery, as liquid product, unreacted butadiene and cyanogen is 53.7% by weight of the initial material input. The yield of product, stripped from the gases leaving the hot reaction tube by a water cooled condensing system is about 36.6% by weight of the total input of butadiene and cyanogen. After removing the more volatile portions, fractional distillation in a Whitmore-Fenske column at 8–12 mm. Hg pressure is used to separate the 2-cyanopyridine from the crude liquid product. About 33% of the crude product is found to be 2-cyanopyridine.

Table II summarizes this data and lists for comparison the results of other trials at different contact times. With the exception of the example at 0.39 second contact time, for which a silica reactor tube was used, all trials were carried out in a steel reactor.

*Table II*

| Temp., ° C. (approx.) | Contact Time, secs. | Reactant Ratio Butadiene: Cyanogen, moles | Total Material Recovery (Per cent of Input, by weight) | Crude Liquid Product (Per cent of Input, by weight) | 2-Cyano Pyridine (Percent of Crude Prod., by weight) | 2-Cyano Pyridine (Percent of Crude Prod., by weight) | Duration of Run |
|---|---|---|---|---|---|---|---|
| 680 | 33 | 0.77:1.0 | 53.7 | 36.6 | 33 | 12.1 | Hours 8 |
| 700 | 90 | 0.82:1.0 | 39 | 34 | 16 | 5.4 | 2.75 |
| 700 | 18 | 1.18:1.0 | 45 | 27 | 23 | 6.3 | 1.5 |
| 700 | 0.39 | 1.0:1.0 | 77.6 | 13–14 | 41.5 | 5.6 | 3 |

*Example III.*—1,3-butadiene and cyanogen in a molar ratio of 0.95:1.0 are sealed in a high pressure steel bomb which is then heated in a furnace to the desired temperature. Table III below is a record of the pressure developed as the temperature is increased:

*Table III*

| Time, hrs | 0 | 2 | 4 | 4.8 | 5 | 5.75 |
|---|---|---|---|---|---|---|
| Temp., °C | 25 | 90 | 178 | 270 | 257 | 230 |
| Pressure, lbs./in.² | | 400 | 620 | 400 | 250 | 200 |

The maximum temperature, 270° C., is above the critical temperature of butadiene and of cyanogen. The liquid product is separated from the solid products of the reaction by extraction with ether, and is obtained in approximately a 30% yield by weight, calculated on the input of cyanogen and butadiene. Fractional distillation of this crude product at 14–15 mm. Hg pressure is used to separate the 2-cyanopyridine which comprises approximately 26% by weight of the crude product.

*Example IV.*—1,3-butadiene and cyanogen in a molar ratio of about 0.88:1.0 are sealed in a glass bomb tube and heated for 28.5 hours at approximately 110° C. From this reaction mixture a liquid product is obtained in a 28–29% yield, calculated on the input of butadiene and cyanogen. Using a Vigreux column for the fractional distillation at 10–12 mm. Hg pressure of this liquid product, the 2-cyanopyridine is separated from the crude product in about 50–55% yield, by weight (calculated on the crude product).

*Example V.*—Isoprene (2-methylbutadiene-1,3) and cyanogen in a molar ratio of about 0.06:1.0 are passed through a steel vapour phase reactor for a period of 2.5 hours. The temperature of the reactor is maintained at about 500° C. and the contact time of the gases in the hot reaction zone is approximately 86 seconds. The total recovery, as product and unreacted isoprene and cyanogen, is about 62% by weight of the initial material input. The crude liquid product removed from the hot gases leaving the reaction zone by a water cooled condensing system is fractionally distilled in a Vigreux column under reduced pressure. The 2-cyanopicolines are collected in the fraction boiling at 88.5° C., 2 mm. Hg pressure. The yield is about 18% by weight, calculated on the initial input of isoprene and cyanogen.

The mixture of 2-cyanopicolines is purified by several recrystallizations from low boiling ligroin. The mixture, melting at 48°–77° C., was found to have the following analysis:

| | Per Cent C | Per Cent H | Per Cent N |
|---|---|---|---|
| Observed | 71.18 | 4.7 | 23.4 |
| Theoretical for $C_7H_6N_2$ | 71.15 | 5.12 | 23.71 | which checks for the compound $C_7H_6N_2$ as shown. By heating the mixture with lime, it is decarboxylated and an oil, B. P. 143–148° C. (atmospheric pressure) is obtained. It is reported in the literature that a mixture of beta and gamma-picolines boils at 142–146° C. at atmospheric pressure. The presence of gamma-picoline in this decarboxylated mixture has been further confirmed by the preparation of an oxalate and a picrate derivative. The oxalate derivative melted at 137.5–139° C., the published values for gamma-picoline oxalate are 137°–138° C. and 139–140° C. The results of the identification of gamma-picoline picrate are: (I) melting point, obs. 161–162° C., literature 163–164° C.; (II) analysis obs. C. 44.34%, H. 2.77%, N. 17.1%, calculated for $C_{12}H_{10}N_4O_7$, C. 44.73%, H. 3.13%, N. 17.4%; (III) the X-ray diffraction pattern was identical with that prepared from authentic gamma-picoline.

*Example VI.*—Chloroprene (2-chlorobutadiene-1,3) and cyanogen in a molar ratio of about 1.0:1.0 are passed through a steel vapour phase reactor for a total time of 9.75 hrs. The temperature of the reactor is maintained at approximately 475° C.–495° C., and the contact time of the gases in the hot reaction zone is about 115 seconds. The total recovery as crude product, unreacted chloroprene and cyanogen, is about 63.1% by weight of the initial material input. The solid material, that has separated from the liquid crude by condensing on the cold glass surfaces, is purified by recrystallization from low boiling ligroin and ether. Its melting point is 83–84° C. The crude liquid product, on fractional distillation in a Vigreux column yields another solid product, that distils over at 108°–120° C. at 3–4 mm. Hg. pressure. Its melting point, after recrystallization from low boiling ligroin is 107.5–108° C. These compounds are isomeric 2-cyanochloropyridines, and are obtained in yields of 3–5% by weight of the initial material input. The analysis found is as follows:

| | C Percent | H Percent | N Percent | Cl Percent |
|---|---|---|---|---|
| (I) M. P. 83–84° C | 51.96 | 2.56 | 20.1 | 26.1 |
| | 51.87 | 2.28 | 20.1 | 25.8 |
| (II) M. P. 107.5–108° C | 51.95 | 2.40 | 20.4 | 25.65 |
| | 51.78 | 2.41 | 20.7 | 25.82 |
| (III) Calc. for $C_6H_3N_2Cl$ | 52.01 | 2.18 | 20.22 | 25.59 |

The compound, M. P. 83–84° C., is further identified as the 2-cyano-5-chloropyridine since hydrolysis yields 5-chloropicolinic acid. (Melting point, with decomposition, found 172–174° C., literature, 169°–170°, 170° C.) The higher melting isomer is the 2-cyano-4-chloropyridine.

*Example VII.*—Cyanogen and 2-methylpentadiene-1,3 in the molar ratio of about 1.16:1.0 are passed through a steel vapour phase reactor for a total time of 4 hrs., 53 minutes. The temperature of the reactor is maintained at approximately 507° C., and the contact time of the gases in the hot reaction zone is about 121 seconds. The total recovery as crude product, unreacted 2-methylpentadiene and cyanogen, is about 75%. The product stripped from the hot gases leaving the reaction zone is obtained in a 61–62% yield, by weight, of the material input and is nearly all solid at room temperature. The solid product is separated from the crude by filtration and is further purified by recrystallization from low boiling ligroin, with the use of decolorizing carbon. It crystalizes in fine white silky needles, of melting point 53–53.5° C. The analyses found are:

| | Percent C | Percent N |
|---|---|---|
| Observed | 72.99, 72.94 | 20.9, 20.7 |
| Theoretical for $C_8H_8N_2$ | 72.7 | 21.2 | and agree well for the formula $C_8H_8N_2$. This compound has been identified as 2-cyano-4,6-lutidine. It does not form a picrate. Hydrolysis with aqueous sodium hydroxide solution, followed by decarboxylation of the sodium salt thus formed, by heating with calcium oxide yields alpha, gamma-lutidine, boiling point, observed 156–157° C., literature values 157° C., 159–159.5° C. The lutidine thus obtained forms a picrate, recrystallized from ethanol, M. P. observed 179–180° C., literature value, 179° C. The product from the reaction of cyanogen and 2-methylpentadiene therefore is 2-cyano-4,6-lutidine.

In addition to the 1,3-dienes already mentioned in the examples, the following, for example, are suitable: butadiene; 2-methyl butadiene; 2,3-dimethyl butadiene, 1,3-pentadiene; 2-cyanobutadiene; 2-chlorobutadiene; 2,3-dichlorobutadiene; 3,4-dimethyl hexadiene-2,4; 2-methyl-pentadiene-1,3; 2-chloropentadiene-1,3; 2-cyanopentadiene-1,3; hexadiene-2,4; 5-methylhexadiene-1,3; 2,6-dimethyl-octadiene-3,5; hexadiene-1,3; 2-cyanohexadiene-1,3; 3-cyanohexadiene-1,3; 3-cyanopentadiene-1,3; 3-chloropentadiene-1,3; 3-cyanohexadiene-2,4; 4-cyanohexadiene-2,4; 2-chlorohexadiene-1,3; 3-chlorohexadiene-1,3; 3-chlorohexadiene-2,4; 4-cholorohexadiene-2,4; 2-methylhexadiene-1,3; 3-methylhexadiene-1,3; 2,3-dimethylhexadiene-1,3; 3-methylhexadiene-2,4; 4-methylhexadiene-2,4; 3,4-dimethylhexadiene-2,4; 1-methylhexadiene-1,3; 2-methylhexadiene-2,4; 4-methylhexadiene-1,3; 5-methylhexadiene-2,4; 2,5-dimethylhexadiene-2,4; 1,4-dimethylhexadiene-1,3; octadiene-3,5.

The above description and examples are intended to be illustrative only. Any modification of or variation therefrom which conforms to the spirit of the invention is intended to be included with the scope of the claims.

Having thus described our invention what we claim is:

1. A process which comprises passing a gaseous mixture of butadiene and cyanogen in a molar ratio of substantially 1:1 through a reaction chamber maintained at approximately 500° C. at such a rate that the gas is present in the reaction chamber for a period of from between 20 and 120 seconds and cooling the gas emerging from the reaction chamber to condense 2-cyanopyridine.

2. A process which comprises passing a gaseous mixture of isoprene and cyanogen in a molar ratio of substantially 1:1 through a reaction chamber maintained at approximately 500° C. at such a rate that the gas is present in the reaction chamber for about 100 seconds and cooling the gas emerging from the reaction chamber to condense a mixture of 2-cyano-4-picoline and 2-cyano-5-picoline.

3. A process which comprises passing a gaseous mixture of 2-chlorobutadiene-1,3 and cyanogen in a molar ratio of substantially 1:1 through a reaction chamber maintained at a temperature of approximately 500° C. at such a rate that the gas is present in the reaction chamber for about 100 seconds and cooling the gas emerging from the reaction chamber to condense a mixture of 2-cyano-4-chloropyridine and 2-cyano-5-chloropyridine.

4. A process which comprises reacting at a temperature from about 90° to 700° C. a gaseous mixture of cyanogen with a 1,3-diene of the general formula

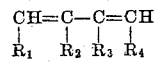

wherein $R_1$ and $R_4$ each represent a member of the group consisting of hydrogen and alkyl radicals containing not more than 2 carbon atoms and $R_2$ and $R_3$ each represent a member of the group consisting of hydrogen, chlorine and the methyl radical, and separating the reaction product of the general formula

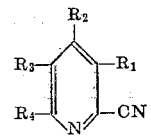

wherein $R_1$, $R_2$, $R_3$ and $R_4$ have the same significance as above defined.

5. A process which comprises passing through a reaction chamber maintained at a temperature from about 400° to 700° C. a gaseous mixture of cyanogen and a 1,3-diene of the general formula

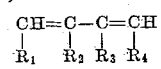

wherein $R_1$ and $R_4$ each represent a member of the group consisting of hydrogen and alkyl radicals containing not more than 2 carbon atoms and $R_2$ and $R_3$ each represent a member of the group consisting of hydrogen, chlorine and the methyl radical, said reactants being present in a ratio of substantially 1:1 and being passed through the reaction chamber at such a rate that the gaseous mixture is present in the reaction chamber for a period between 130 and 0.3 seconds and cooling the gas emerging from the reaction chamber to separate the reaction product of the general formula

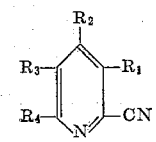

wherein $R_1$, $R_2$, $R_3$ and $R_4$ have the same significance as above defined.

IVAN MAXWELL ROBINSON.
GEORGE JOHN JANZ.

REFERENCES CITED

The following references are of record in the file of this patent:

Maier, "Das pyridine und seine Derivatives," page 206 (1934).
Chemical Abstracts, p. 6886b, vol. 41, 1947.
Chemical Abstracts, p. 6797b, vol. 41, 1947.